United States Patent
Suciu et al.

(10) Patent No.: US 9,121,346 B2
(45) Date of Patent: *Sep. 1, 2015

(54) PUMP SYSTEM FOR TMS AOC REDUCTION

(75) Inventors: Gabriel L. Suciu, Glastonbury, CT (US); Brian D. Merry, Andover, CT (US); Christopher M. Dye, Glastonbury, CT (US); Jorn A. Glahn, Manchester, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 789 days.

This patent is subject to a terminal disclaimer.

(21) Appl. No.: 13/419,649

(22) Filed: Mar. 14, 2012

(65) Prior Publication Data
US 2013/0239588 A1 Sep. 19, 2013

(51) Int. Cl.
*F02K 99/00* (2009.01)
*F02C 7/14* (2006.01)
*F02C 7/224* (2006.01)
*F04D 29/58* (2006.01)

(52) U.S. Cl.
CPC . *F02C 7/14* (2013.01); *F02C 7/224* (2013.01); *F04D 29/5826* (2013.01); *F05D 2250/36* (2013.01)

(58) Field of Classification Search
CPC .................................. F02K 9/64; F02C 7/18
USPC .................................................. 60/266, 267
See application file for complete search history.

(56) References Cited

U.S. PATENT DOCUMENTS

| | | | |
|---|---|---|---|
| 4,722,666 A | 2/1988 | Dennison et al. |
| 5,269,135 A | 12/1993 | Vermejan et al. |
| 5,317,877 A | 6/1994 | Stuart |
| 5,845,483 A | 12/1998 | Petrowicz |
| 6,250,061 B1 | 6/2001 | Orlando |
| 7,231,767 B2 | 6/2007 | Whiting |
| 7,658,060 B2 | 2/2010 | Zysman et al. |
| 7,886,520 B2 | 2/2011 | Stretton et al. |
| 2007/0245738 A1 | 10/2007 | Stretton et al. |
| 2007/0245739 A1 | 10/2007 | Stretton et al. |
| 2009/0123274 A1 | 5/2009 | Chaudhry |
| 2009/0324396 A1 | 12/2009 | Short et al. |
| 2010/0229567 A1 | 9/2010 | Beardsley |
| 2011/0056208 A1 | 3/2011 | Norris et al. |
| 2011/0203293 A1 | 8/2011 | Glahn |

OTHER PUBLICATIONS

International Preliminary Report on Patentability issued Sep. 16, 2014.

*Primary Examiner* — Craig Kim
(74) *Attorney, Agent, or Firm* — Bachman & LaPointe, P.C.

(57) ABSTRACT

An engine includes a duct containing a flow of cool air and a pump system having an impeller with an inlet for receiving air from the duct and an outlet for discharging air into a discharge manifold. The discharge manifold containing at least one heat exchanger which forms part of a thermal management system.

17 Claims, 3 Drawing Sheets

PUMP SYSTEM FOR TMS AOC REDUCTION

BACKGROUND

The present disclosure relates to a pump system for use with a gas turbine engine to provide a more compact thermal management system.

Gas turbine engines typically use a number of air-to-air heat exchangers as part of a thermal management system (TMS) to reject internal heat to the engine's surroundings. Heat exchanger effectiveness depends on area and delta-Pressure across the exchanger unit. As fan pressure ratio has dropped with newer engine designs, heat exchangers can grow prohibitively large in size. Heat exchangers are more difficult to install, heavier, and more costly to produce as size increases.

SUMMARY

In accordance with the present disclosure, there is provided an engine which broadly comprises a duct containing a flow of cool air, a pump system comprising an impeller having an inlet for receiving air from the duct and an outlet for discharging air into a discharge manifold, and the discharge manifold containing at least one heat exchanger which forms part of a thermal management system.

Further in accordance with the present disclosure, there is provided a pump system for thermal management system, which pump system broadly comprises an air intake for receiving air from a supply of air, an impeller having an intake for receiving the air and an outlet for discharging the air, and a discharge manifold having at least one heat exchanger incorporated therein which forms part of the thermal management system.

Other details of the pump system for TMS AOC reduction are set forth in the following detailed description and the accompanying drawings wherein like reference numerals depict like elements.

DETAILED DESCRIPTION

In accordance with the present disclosure, a pump is used to raise pressure of flow through a TMS heat exchanger (or set of heat exchangers in series), increasing effectiveness and thereby reducing the required heat exchanger size. The impeller may be driven by the engine towershaft, and thus may be located in the relatively cooler forward region of the engine cowl. Heat exchangers may be closely located to the impeller discharge in a duct which exhausts into the fan duct. It is also desirable to closely locate a Fuel-Oil Cooler (FOC) unit, typically used in similar engine configurations and usually plumbed to the fuel control/pump and the AOC's. The axial gearbox lends itself well to this design due to the near proximity of lube and fuel system components with the gearbox towershaft.

Figure 1:
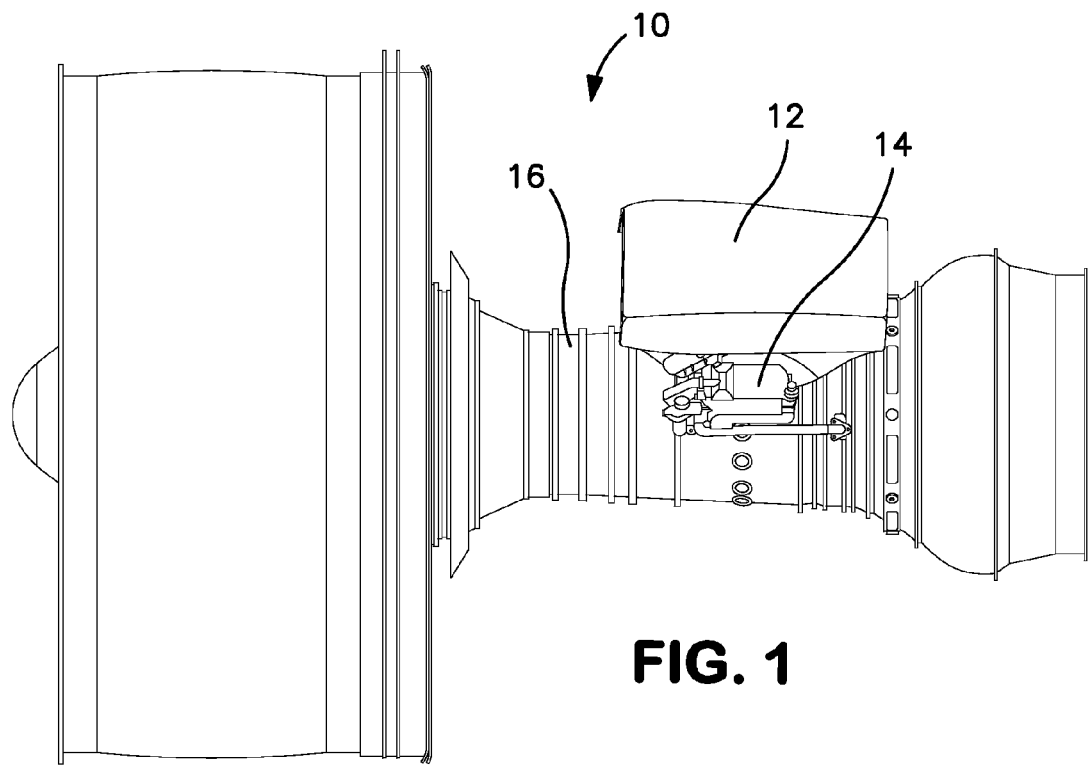
FIG. 1 is a side view of an engine.
Figure 2:
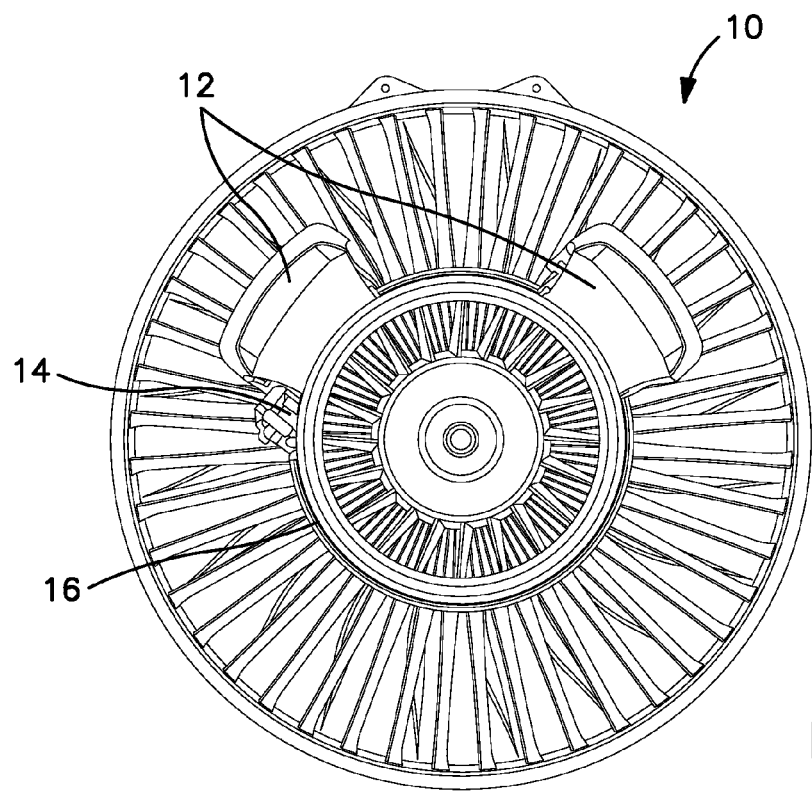
FIG. 2 is a rear view of the engine of FIG. 1.

Referring now to FIGS. 1 and 2, there is shown an engine with a thermal management system (TMS). As can be seen from FIGS. 1 and 2, the engine 10 has air-oil coolers 12 and a fuel oil cooler 14 mounted to the engine core 16.

Figure 3:
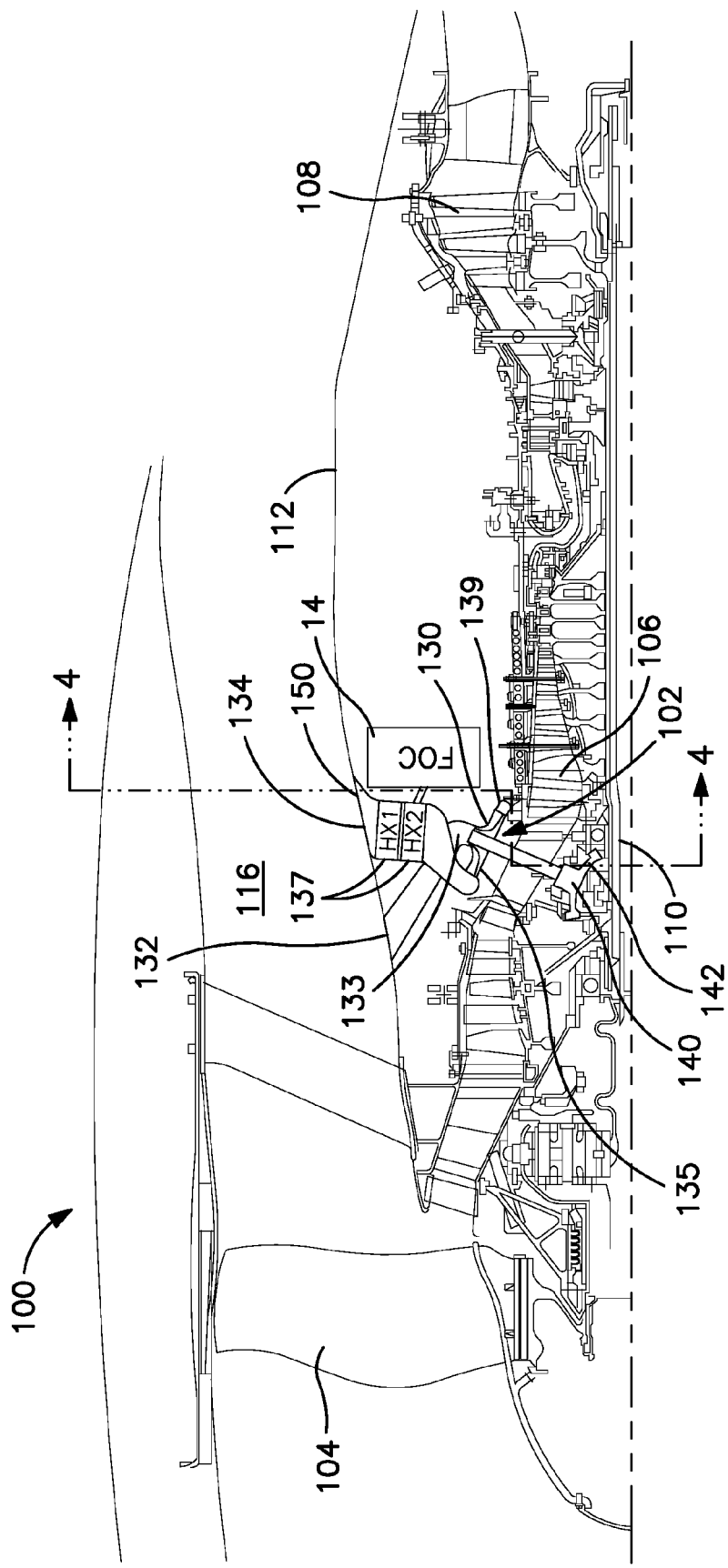
FIG. 3 is a side view of an engine having the pump system of the present disclosure.

Referring now to FIG. 3, there is shown an engine 100 having a pump system 102 for the thermal management system. The engine 100 includes a fan 104, a high pressure compressor 106, and a turbine section 108. The high pressure compressor 106 and the turbine section 108 are connected by at least one spool 110. As can be seen from FIG. 3, the high pressure compressor 106 and the turbine section 108 are housed in a core 112. Further, the fan 104 is surrounded by a cowl 114. A by-pass flow duct 116 is created between the cowl 114 and the core 112. Air flow created by the fan 104 passes through the by-pass flow duct 116.

The pump system 102 includes an impeller 130 and an intake manifold 132 for delivering air from the by-pass flow duct 116 to the intake 133 of the impeller 130. The pump system 102 further includes a heat exchanger discharge manifold 134 connected to an outlet 135 of the impeller 130. Mounted within the heat exchanger discharge manifold 134 is one or more heat exchangers 137 which may be used as air-oil coolers. The manifold 134 delivers air to the heat exchangers 137 and then discharges the air through the outlet 150 into the by-pass duct 116. If desired, a 360 degree scroll collector 139 may surround the impeller 130.

The impeller 130 may be driven via a towershaft 140. The towershaft 140 may be connected to one of the spools 110, either a high-spool which connects the high pressure compressor to a high pressure turbine section or a low-spool which connects the fan 104 to a low pressure turbine section or in some circumstances a mid-spool that connects the mid-pressure compressor to a mid-pressure turbine section. The towershaft 140 may be connected to the spool 110 via a drive gear 142.

As can be seen from the foregoing description, cool air from the fan stream is taken into the pump system via the intake manifold 132. The discharge from the impeller 130 flows into a single duct (manifold 134) to the heat exchangers 137.

Figure 4:
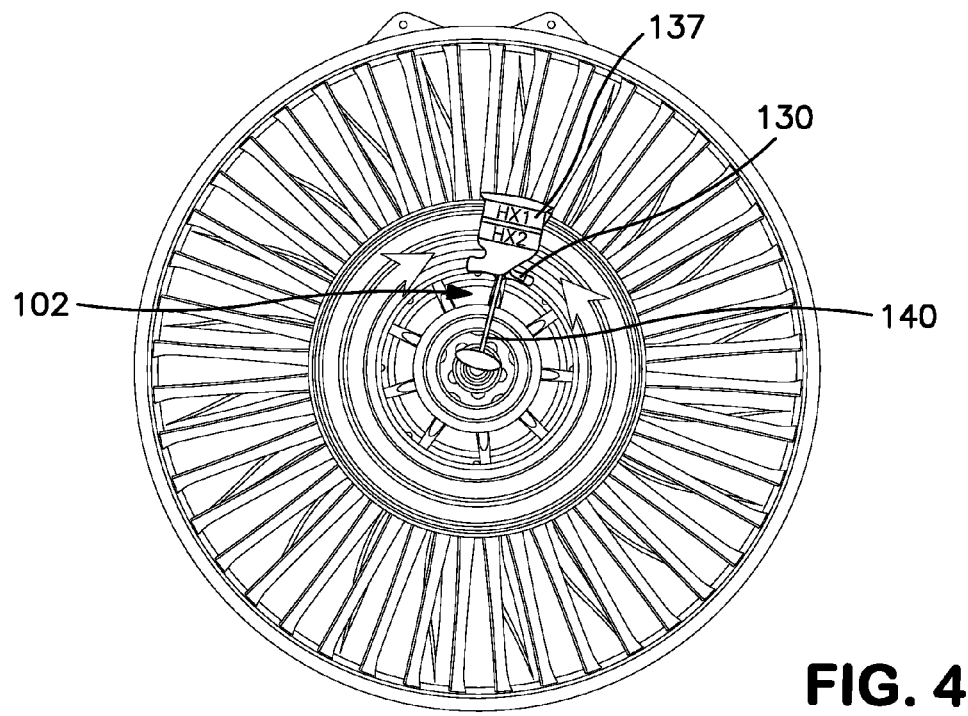
FIG. 4 is a sectional view taken along lines 4-4 of FIG. 3.

As shown in FIG. 4, the pump system 102 can be located at any convenient tangential location.

If desired, the towershaft 140 may be incorporated with an engine accessory gearbox (AGB) using the existing towershaft as a means of the drive power. If desired, the pump system may be incorporated into the AGB housing itself, the towershaft housing, or the layshaft housing to reduce packaging space.

Figure 5:
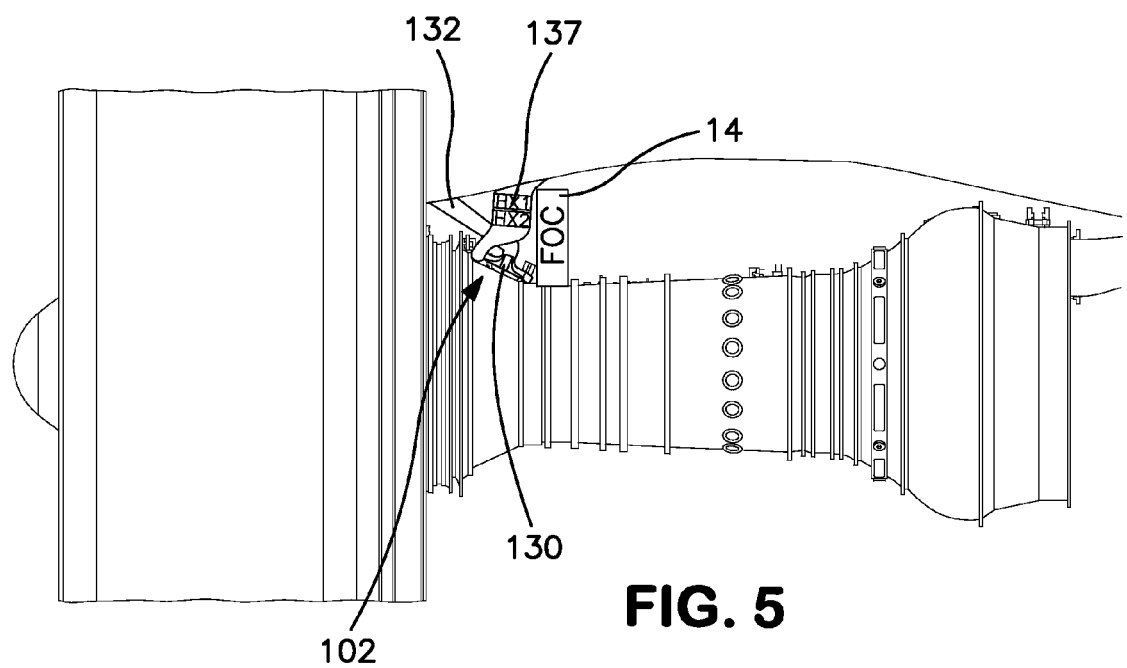
FIG. 5 illustrates a side view of an engine having the pump system of FIG. 3.

Referring now to FIG. 5, there is shown one embodiment of an engine having the pump system 102 according to the present disclosure.

By using the pump system of the present invention, it is possible to reduce the size of the air-oil coolers (AOCs) by more than 80% due to the LP rise across the pump. It is further possible to closely integrate the TMS heat exchanger system. Overall TMS system weight will decrease due to the smaller heat exchanger size. Externals packaging may improve also due to reduced AOC size.

There has been provided by the instant disclosure a pump system for a TMS AOC reduction. While the pump system has been described in the context of specific embodiments thereof, other unforeseen alternatives, modifications, and variations may become apparent to those skilled in the art having read the foregoing description. Accordingly, it is intended to embrace those alternatives, modifications, and variations as fall within the broad scope of the appended claims.

What is claimed is:

1. An engine comprising:
   a fan;
   a by-pass duct containing a flow of air created by said fan;
   a pump system mounted within a core of said engine, said pump system comprising an impeller having an inlet for receiving air from said by-pass duct and an outlet for discharging air into a discharge manifold, wherein said pump system further comprises a towershaft for driving said impeller; and
   said discharge manifold containing at least one heat exchanger which forms part of a thermal management system.

2. The engine according to claim 1, further comprising:
   an intake manifold for receiving said air from said by-pass duct and for delivering said air to said inlet.

3. The engine according to claim 1, further comprising:
   said at least one heat exchanger in said discharge manifold comprising an air-oil cooler.

4. The engine according to claim 1, wherein said discharge manifold has two heat exchangers incorporated therein.

5. The engine according to claim 4, wherein each of said two heat exchangers comprises an air-oil cooler.

6. The engine according to claim 1, further comprising a spool and said towershaft being connected to said spool by a drive gear.

7. The engine according to claim 6, wherein said spool is a low spool connected to a fan.

8. The engine according to claim 6, wherein said spool is a high spool connected to a high pressure compressor.

9. The engine according to claim 1, wherein said discharge manifold discharges air into said by-pass duct.

10. A pump system for thermal management system, said pump system comprising:
    an air intake for receiving air from a supply of air;
    an impeller having an intake for receiving said air and an outlet for discharging said air;
    a towershaft for driving said impeller, wherein said towershaft is driven by a spool of an engine; said spool comprising at least one of a high-spool configured to couple a high pressure compressor to a high pressure turbine section, a low-spool configured to couple a fan to a low pressure turbine section, and a mid-spool configured to couple a mid-pressure compressor to a mid-pressure turbine section;
    a discharge manifold having at least one heat exchanger incorporated therein which forms part of said thermal management system; wherein said discharge manifold has an outlet for discharging air into a by-pass duct of an engine; and
    wherein said pump system is mounted within a core of said engine.

11. The pump system of claim 10, wherein said spool is a low spool.

12. The pump system of claim 11, wherein said spool is a high spool.

13. The pump system of claim 11, wherein said towershaft is connected to said spool by a drive gear.

14. The pump system of claim 10, further comprising two heat exchangers incorporated into said discharge manifold.

15. The pump system of claim 14, wherein each of said heat exchangers comprises an air oil cooler.

16. The pump system of claim 10, wherein said towershaft is incorporated with an engine accessory gearbox.

17. The pump system of claim 16, wherein said pump system is incorporated into one of a housing of said engine accessory gearbox, a towershaft housing, and a layshaft housing.

\* \* \* \* \*